United States Patent
Novozhenets et al.

(10) Patent No.: US 10,832,508 B2
(45) Date of Patent: Nov. 10, 2020

(54) INTENT DRIVEN BUILDING OCCUPANT PATH AND SYSTEM INTERACTION OPTIMIZATION

(71) Applicant: Carrier Corporation, Palm Beach Gardens, FL (US)

(72) Inventors: Yuri Novozhenets, Pittsford, NY (US); Dang Nguyen, Alpharetta, GA (US); Jason Higley, Pittsford, NY (US); Wilmann Gomez, New Britain, CT (US); Ed Gauthier, Fairport, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/630,653

(22) PCT Filed: Jul. 11, 2018

(86) PCT No.: PCT/US2018/041619
§ 371 (c)(1),
(2) Date: Jan. 13, 2020

(87) PCT Pub. No.: WO2019/014334
PCT Pub. Date: Jan. 17, 2019

(65) Prior Publication Data
US 2020/0168018 A1 May 28, 2020

Related U.S. Application Data

(60) Provisional application No. 62/532,491, filed on Jul. 14, 2017.

(51) Int. Cl.
*H04W 24/00* (2009.01)
*G07C 9/00* (2020.01)
(Continued)

(52) U.S. Cl.
CPC .......... *G07C 9/00571* (2013.01); *G07C 9/27* (2020.01); *G07C 9/28* (2020.01); *H04W 4/029* (2018.02);
(Continued)

(58) Field of Classification Search
CPC . H04W 4/029; H04W 8/245; H04M 1/72519; H04M 1/72522; G07C 9/00571; G07C 9/27; G07C 9/28; G07C 2209/08
(Continued)

(56) References Cited

U.S. PATENT DOCUMENTS 9,424,725 B1 * 8/2016 Keohane ................. G06F 16/29
9,560,519 B1 * 1/2017 McCracken, Jr. ...... H04W 8/18
(Continued)

FOREIGN PATENT DOCUMENTS

| GB | 2345822 A | 7/2000 |
|---|---|---|
| WO | 2015068148 A2 | 5/2015 |

OTHER PUBLICATIONS

Written Opinion of the International Searching Authorithy for International Application No. PCT/US2018/041619; dated Oct. 11, 2018; Report Received Date: Oct. 25, 2018; 9 pages.
(Continued)

*Primary Examiner* — Danh C Le
(74) *Attorney, Agent, or Firm* — Cantor Colburn LLP (57) ABSTRACT

A method of controlling access to at least one access point along a path is provided. The method comprising: receiving a current position of a user of a user device; checking a schedule of the user of the user device; determining a next event in the schedule; determining an event destination of a next event in the schedule; determining a path from the current position to the event destination; determining an access device list of one or more access devices located on the path; transmitting a command to each access device
(Continued)

when the user of the user device is located within a position boundary of the access device; and adjusting the access device when the command is received.

16 Claims, 3 Drawing Sheets

(51) Int. Cl.
*H04W 4/029* (2018.01)
*G07C 9/27* (2020.01)
*G07C 9/28* (2020.01)
*H04M 1/725* (2006.01)

(52) U.S. Cl.
CPC ..... *G07C 2209/08* (2013.01); *H04M 1/72519* (2013.01); *H04M 1/72522* (2013.01)

(58) Field of Classification Search
USPC ...................................... 455/457, 456.1, 418
See application file for complete search history.

(56) References Cited

U.S. PATENT DOCUMENTS

| | | | |
|---|---|---|---|
| 9,681,360 B1* | 6/2017 | Salyers | H04W 48/04 |
| 10,097,368 B2* | 10/2018 | Balraj | H04L 12/2814 |
| 2016/0249212 A1* | 8/2016 | Padur | H04W 12/06 |
| 2016/0284139 A1* | 9/2016 | Klein | G07C 9/20 |
| 2016/0284186 A1* | 9/2016 | Pavlich | H04W 24/04 |
| 2017/0046891 A1 | 2/2017 | Trivelpiece et al. | |
| 2017/0331827 A1* | 11/2017 | Salyers | H04L 63/029 |
| 2018/0220301 A1* | 8/2018 | Gallagher | H04W 12/0609 |

OTHER PUBLICATIONS

Notification of Transmittal of the International Search Report for International Application No. PCT/US2018/041619; dated Oct. 11, 2018; Report Received Date: Oct. 25, 2018; 6 pages.

* cited by examiner

FIG. 2 ial Patent Application Ser. No. 62/532,
INTENT DRIVEN BUILDING OCCUPANT PATH AND SYSTEM INTERACTION OPTIMIZATION

CROSS-REFERENCE TO RELATED APPLICATIONS

This application is based on International Application No. PCT/US2018/041619 filed Jul. 11, 2018, which claims priority to U.S. Provisional Patent Application Ser. No. 62/532,491 filed Jul. 14, 2017, both of which are incorporated herein by reference in their entirety.

BACKGROUND

The subject matter disclosed herein generally relates to the field of access system, and more particularly to an apparatus and method for controlling access to multiple access points on a path to a destination.

Existing access controls allow user devices to unlock access devices. Existing online access control to access points are commonly set up such that the user devices must be presented to the access device in order to unlock an access devices. The desire to control access to access points is increasing as security requirements increase and the expense to install access devices decreases. However with buildings becoming more and more secure, one must present their user device to several different access points on their path to a destination. Continually presenting the user device to multiple access points is exhaustive, monotonous, and wastes valuable time.

BRIEF SUMMARY

According to one embodiment, a method of controlling access to at least one access point along a path is provided. The method comprising: receiving a current position of a user of a user device; checking a schedule of the user of the user device; determining a next event in the schedule; determining an event destination of a next event in the schedule; determining a path from the current position to the event destination; determining an access device list of one or more access devices located on the path; transmitting a command to each access device when the user of the user device is located within a position boundary of the access device; and adjusting the access device when the command is received.

In addition to one or more of the features described above, or as an alternative, further embodiments may include where the determining an event destination of a next event in the schedule further comprises: obtaining one or more historical destinations in response to current time; determining a likelihood of each historical destination; and selected the historical destination with the highest likelihood to be the event destination.

In addition to one or more of the features described above, or as an alternative, further embodiments may include where the determining an event destination of a next event in the schedule further comprises: obtaining one or more historical destinations in response to current time; determining a likelihood of each historical destination; displaying each historical destination on the user device; and receiving a selection input from the user device, the selection input identifying one of the historical destinations as the event destination.

In addition to one or more of the features described above, or as an alternative, further embodiments may include where the historical destinations are displayed on the user device in order of descending likelihood.

In addition to one or more of the features described above, or as an alternative, further embodiments may include where the access device list further includes the position boundary for each access device.

In addition to one or more of the features described above, or as an alternative, further embodiments may include where the access device list further includes the command for each access device.

In addition to one or more of the features described above, or as an alternative, further embodiments may include where the adjusting further comprises: unlocking a door lock.

In addition to one or more of the features described above, or as an alternative, further embodiments may include where the adjusting further comprises: opening an elevator door.

In addition to one or more of the features described above, or as an alternative, further embodiments may include where prior to the transmitting the method further comprises: comparing the current position to each position boundary.

In addition to one or more of the features described above, or as an alternative, further embodiments may include where the determining an event destination of a next event in the schedule further comprises: receiving a selection input from the user device, the selection input identifying an event destination as a next event.

An access control system is provided. The access control system comprising: a processor; a memory comprising computer-executable instructions that, when executed by the processor, cause the processor to perform operations, the operations comprising: receiving a current position of a user of a user device; checking a schedule of the user of the user device; determining a next event in the schedule; determining an event destination of a next event in the schedule; determining a path from the current position to the event destination; and determining an access device list of one or more access devices located on the path.

In addition to one or more of the features described above, or as an alternative, further embodiments may include where the operations further comprise: transmitting the access device list to the user device; wherein the access device list enables the user device to transmit a command to each access device when the user of the user device is located within a position boundary of the access device; wherein the command adjusts the access device when the command is received.

In addition to one or more of the features described above, or as an alternative, further embodiments may include where the operations further comprise: transmitting a command to each access device when the user of the user device is located within a position boundary of the access device, wherein the command adjusts the access device when the command is received.

In addition to one or more of the features described above, or as an alternative, further embodiments may include where the determining an event destination of a next event in the schedule further comprises: obtaining one or more historical destinations in response to current time; determining a likelihood of each historical destination; and selected the historical destination with the highest likelihood to be the event destination.

In addition to one or more of the features described above, or as an alternative, further embodiments may include where the determining an event destination of a next event in the schedule further comprises: obtaining one or more historical destinations in response to current time; determining a likelihood of each historical destination; enabling the user device to display each historical destination on the user device; and receiving a selection input from the user device, the selection input identifying one of the historical destinations as the event destination.

In addition to one or more of the features described above, or as an alternative, further embodiments may include where the historical destinations are displayed on the user device in order of descending likelihood.

In addition to one or more of the features described above, or as an alternative, further embodiments may include where the access device list further includes the position boundary for each access device.

In addition to one or more of the features described above, or as an alternative, further embodiments may include where the access device list further includes the command for each access device.

In addition to one or more of the features described above, or as an alternative, further embodiments may include where the command adjusts the access device by unlocking a door lock.

In addition to one or more of the features described above, or as an alternative, further embodiments may include where the command adjusts the access device by opening an elevator door.

Technical effects of embodiments of the present disclosure include determining a path for a user of a user device and adjusting each access device along the path when the user of the user device is located within a position boundary of the access device.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1A:
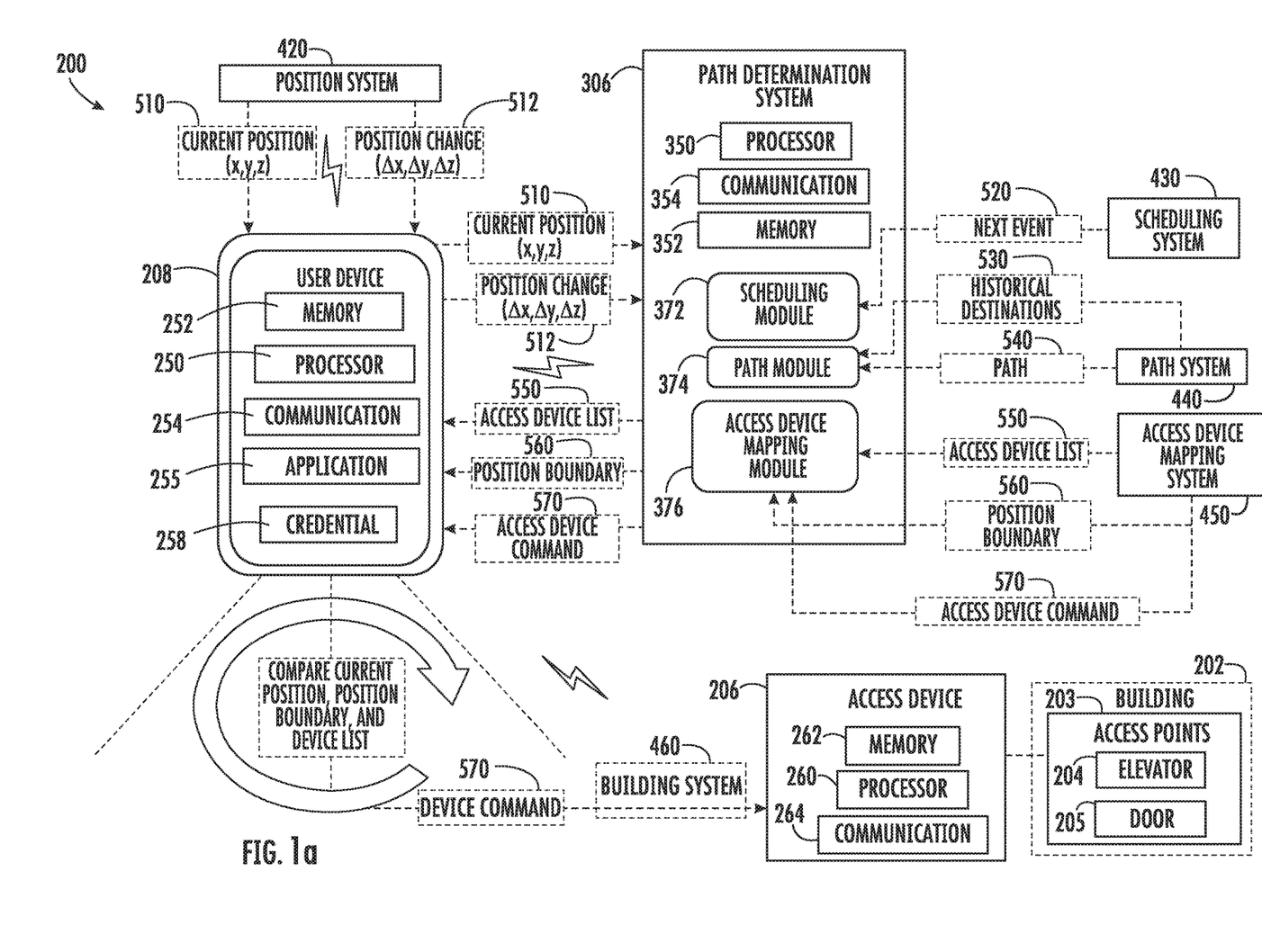
FIG. 1a illustrates a schematic view of an access control system, in accordance with an embodiment of the disclosure.
Figure 1B:
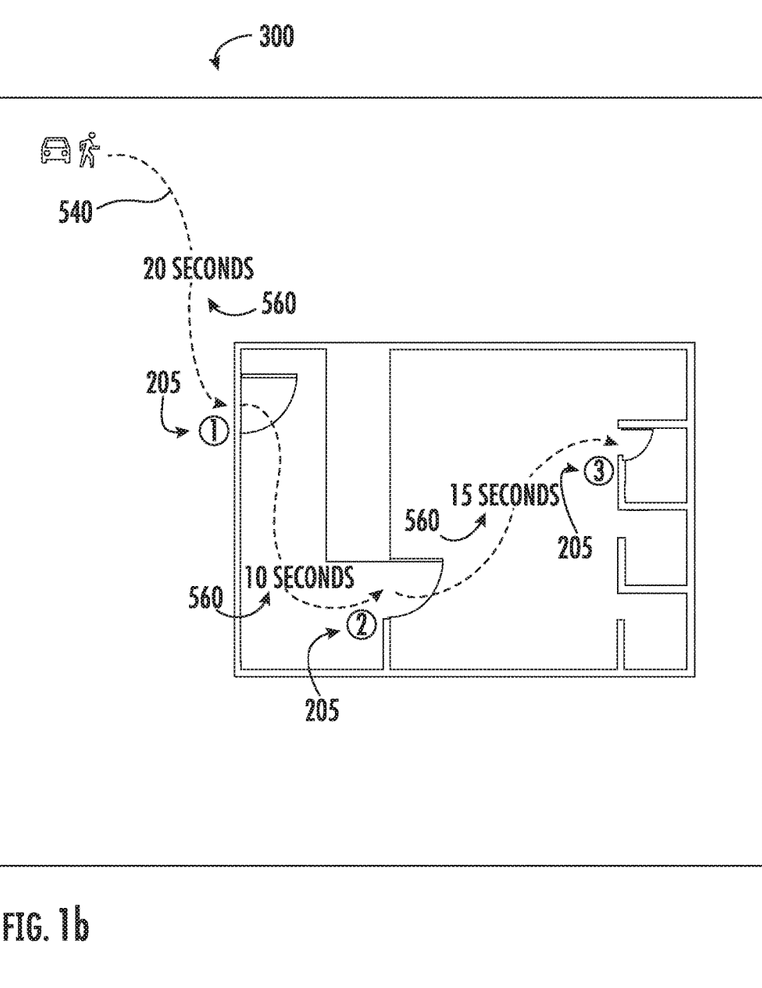
FIG. 1b illustrates a schematic view of an application on a user device and a graphical representation of a path, in accordance with an embodiment of the disclosure.

Referring to FIGS. 1a and 1b. FIG. 1a depicts an access control system 200 in an example embodiment. The access control system 200 includes at least one access device 206 to grant/deny access to access points 203, such as for example an elevator 204 or a door 205. The access device 206 grant/deny access to access points 203 by adjusting the access point 203, such as, for example, unlocking a door lock or opening an elevator door. The door 205 and an elevator 204 may be installed at a building 202. In some embodiments, the building 202 may be a building or a collection of buildings that may or may not be physically located near each other. The building 202 may include any number of floors. Persons entering the building 202 may enter at a lobby floor, or any other floor, and may go to a destination floor via one or more conveyance devices, such as the elevator 204. Persons entering the building 202 may be required to enter a door 205. In another non-limiting embodiment, the door 205 may be outside of a building, such as, for example a car door. The door 205 may include but is not limited to a door in a wall of the building 202, a door on the outside of the building 202, a garage door, a parking lot access gate, a turnstile, a car door, or similar access point known to one of skill in the art.

The access points 203 may be operably connected to one or more access devices 206. The access device 206 may be configured to control access to the access points 203, such as, for example an elevator 204 and a door 205. Although only one elevator 204 is shown in FIG. 1a, it is understood that any number of elevators 204 may be used in the access control system 200. It is understood that other components of the elevator 204 (e.g., elevator car, doors, drive, counterweight, safeties, etc.) are not depicted for ease of illustration. It is also understood that each elevator 204 may utilize one or more access devices 206. In an example, there may be an access device located on each floor of the building 202 located proximate an elevator shaft. Further, although only one door 205 is shown in FIG. 1a, it is understood that any number of doors 205 may be used in the access control system 200. It is understood that other components of doors 205 are not depicted for ease of illustration (e.g., locks). It is also understood that each door 205 may utilize one or more access devices 206.

In a non-limiting example, the access device 206 may be a door reader or door strike. The access device 206 may include a processor 260, memory 262 and communication module 264 as shown in FIG. 1a. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the access device 206 including executable instructions stored therein, for instance, as firmware. The memory 262 may store a unique device ID for each access device 206. The memory 262 may also store a set of geo-location information for each access device 206. The communication module 264 allows for secure bi-directional communication wirelessly with a user device 208. The communication module 264 may implement one or more communication protocols as described in further detail herein.

Also shown in FIG. 1a is a user device 208. The user device 208 is capable of secure bi-directional communication with the access device 206, a positioning system 420, and a path determination system 306. The positioning system 420 configured to determine the location of a user of the user device 208. The positioning system 420 may use various methods in order to determine the location of the user device 208 such as, for example, GPS, Bluetooth triangulation, Wi-Fi triangulation, cellular signal triangulation, RFID, image recognition/video analytics or any other location determination method known to one of skill in the art. The user device 208 is configured to receive a current position 510 of a user of the user device 208 from the positing system 420, which includes the (x, y, z) coordinates of the user device 208 on a map. The (x, y, z) coordinates may translate to a latitude, a longitude, and an elevation. The user device 208 is also configured to receive a position change 512 from the positioning system 420, which includes a change (Δx, Δy, Δz) in the (x, y, z) coordinates of the user device 208 on a map. The user device 208 is configured to transmit at least one of the current position 510 and the position change 512 to the path determination system 306, which will be discussed further below.

The user device 208 may be a computing device such as a desktop computer. The user device 208 may also be a mobile computing device that is typically carried by a person, such as, for example a phone, PDA, smart watch, tablet, laptop, etc. The user device 208 may also be two separate devices that are synced together such as, for example, a cellular phone and desktop computer synced over an internet connection. The user device 208 may include a processor 250, memory 252 and communication module 254 as shown in FIG. 1. The processor 250 can be any type or combination of computer processors, such as a microprocessor, microcontroller, digital signal processor, application specific integrated circuit, programmable logic device, and/or field programmable gate array. The memory 252 is an example of a non-transitory computer readable storage medium tangibly embodied in the user device 208 including executable instructions stored therein, for instance, as firmware. The communication module 254 may implement one or more communication protocols as described in further detail herein. The user device 208 is configured to store a unique credential 258 that may be shared with the access device 206 and path determination system 306. In a non-limiting example, the user device 208 may belong to an employee and/or resident of the building 202 and thus the employee and/or resident is the user of the user device 208. The user device 208 may also include an application 255. Embodiments disclosed herein, may operate through the application 255 the user device 208.

Also shown in FIG. 1a is a path determination system 306. The path determination system 306 is configured to determine a path 540 to a next event 520 of the user of the user device 208 and enable the user of the user device 208 to adjust access devices 206 on the path 540 to the next event 520 when the user of the user device 208 is within a positional boundary 560 of the access device 206. The path determination system may include a processor 350, memory 352 and communication module 354 as shown in FIG. 1. The processor 350 can be any type or combination of computer processors, such as a microprocessor, microcontroller, digital signal processor, application specific integrated circuit, programmable logic device, and/or field programmable gate array. The memory 352 is an example of a non-transitory computer readable storage medium tangibly embodied in or operably connected to the path determination system including executable instructions stored therein, for instance, as firmware. The communication module 354 may implement one or more communication protocols as described in further detail herein.

The path determination system 306 may include a scheduling module 372 in communication with a scheduling system 430, a path module 374 in communication with a path system 440, and an access device mapping module 376 in communication with an access device mapping system 450. In the illustration of FIG. 1a, the scheduling system 430, the path system 440, and the access device mapping system 450 are illustrated as separate systems external to the path determination system 306 and communicate with their respective modules (i.e. scheduling module 372, path module 374, and access device mapping module 376). In an embodiment, at least one of the scheduling system 430, the path system 440, and the access device mapping system 450 is included within the path determination system 306. In another embodiment, at least one of the scheduling system 430, the path system 440, and the access device mapping system 450 is included within the user device 208.

The scheduling system 430 includes the calendar schedule of the user of the user device 208 including but not limited to meetings, events, and reminders. In an example, the scheduling system 430 may include electronic calendars such as, Microsoft Outlook Calendars, Gmail Calendars, iCloud Calendar, and Android Calendars. The scheduling system 430 is configured to transmit the next event 520 on the calendar for the user of the user device 208 when the path determination system 306 receives at least one of a current position 510 and a position change 512. In an alternative embodiment, the next event 520 may be selected by a user on the user device 208 through a user input such as selecting a destination, typing in the destination, speaking the destination, or any other similar user input method known to one of skill in the art. The next event 520 may be destination instead of a scheduled meeting. In another alternative embodiment, the next event 520 may be selected by a user on the user device 208 through a user action that may signal intent to move to a destination. For instance, the user may get up from their desk around noon and start heading towards the cafeteria.

If there is no next event 520 scheduled on the calendar of the user of the user device 208 then the path system 440 will check historical destinations 530 of the user of the user device 208 likely for the user of the user device 208 at the current time. For example, if the user of the user device 208 is always in the lunch room at 11:30 am, the lunch room will be a historical destination at 11:30 am. The likelihood of each historical destination 530 is then determined by at least one of the path determination system 306 and the path system 440. The likelihood is the probability that the user of the user device 208 will be return to the historical destination 530 as the next event 520. In an embodiment, the path determination system 306 is configured to determine the likelihood of each historical destination 530. The next event 520 may be automatically determined to be the historical destination 530 with the highest likelihood. Alternatively, each historical destination 530 may be transmitted to the user device 208 and displayed on the user device 208, then the user of the user device 208 may select a historical destination 530 as the next event 520 on the user device 208 through a selection input. In three non-limiting examples, the selection input may be touching a touch screen of the user device 208, clicking a physical button or using a voice command. In an embodiment, the historical destinations 530 are displayed on the user device in order of descending likelihood.

Once the next event 520 is determined, the path system 440 is configured to determine a path 540 to the next event 520. The path 540 may be determined in response to at least one of a historical route and a shortest route from the current position 510 to the next event 520. The historical route may be a path that the user of the user device typically takes to get to the next event 520. The access device mapping system 450 determines an access device list 550 in response to the path 540. In an embodiment, the access device mapping system 450 determines each access device 206 located on the path 540 and includes each of these access devices 206 on the access device list 550. In an embodiment, the access device list 550 also includes at least one of a position boundary 560 for each access device 206 on the access device list 550 and an access device command 570 for each access device 206 on the access device list 550.

As seen in FIG. 1b, the positional boundary 560 may be established for each access device 206 along a path 540. FIG. 1b shows the application 255 on the user device 208 and also a graphical representation 300 of a path 540 for a user of a user device 208. The position boundary 560 is a range around an access device 206 from which a user device 208 may transmit an access command 570 to adjust the access device 206. The positional boundary 560 may be expressed as a time and/or a distance as seen in FIG. 1b. For example, the position boundary 560 for a door lock may be 3 ft (91.44 cm), thus the door lock will only unlock when the user of the user device 208 is within 3 ft (91.44 cm) of the door lock. In another example, a positional boundary for a door lock may be 3 seconds, thus the door lock will only unlock when the user device 208 is within 3 seconds of the door lock. The positional boundary 560 may be established for multiple access devices 206 and associated access points 203 in a path 540. In the example of FIG. 1b, multiple doors 205 are shown for access points 203 and the positional boundary 560 for each 205 may be adjusted. The positional boundary 560 may be adjusted by a user of the user device 208 through an application 255. Additionally, as shown in FIG. 1b, a user of the user device 208 may add 302 additional access points 203 (ex: doors 205 in FIG. 1b) to the particular path 540 through the application 255. Further, a user of the user device 208 may create their own path 540 manually by adding individual access points 203 to a new path 540. The application will show the projected time 562 and projected distance 564 between each access point 203 (ex: doors 205 in FIG. 1b) along a path 540. In a non-limiting example, if while traveling along a path 540 a user carrying a user device 208 does not reach the next access point 203 (ex: doors 205 in FIG. 1b) within the projected time 562, then the access point 203 may be locked out to that user of the user device 208 until intent is signaled by that user of the user device 208 to enter the access point 203 again. As also shown in FIG. 1b, a user of the user device 208 may favorite 304 a particular path 540 through the application 255. The access device list 550 may be transmitted to the user device and the user device 208 may continually monitor the current position 510 to determine whether the user of the user device 208 is within the position boundary 560 of an access device 206.

The user device 208 communicates with the access device 206 and the path determination system 306. The communication may occur over a wireless network, such as 802.11x (Wi-Fi), short-range radio (Bluetooth), cellular, satellite, etc. In some embodiments, the path determination system 306 may include, or be associated with (e.g., communicatively coupled to) a building system 460, such as kiosk, beacon, lantern, bridge, router, network node, building intercom system, etc. The building system 460 may communicate with the user device 208 using one or more communication protocols or standards. For example, the building system 460 may communicate with the user device 208 using near field communications (NFC). In an embodiment, the user device 208 may communicated with an access device 206 through a building system 460. In other embodiments, the user device 208 may establish communication with a path determination system 306 or an access device 206 that is not associated with a building system 460 in the building 202. This connection may be established with various technologies including GPS, 802.11x (Wi-Fi), cellular, or satellite, by way of non-limiting example. In example embodiments, the user device 208 communicates over multiple independent wired and/or wireless networks. Embodiments are intended to cover a wide variety of types of communication between the user device 208, the access device 206 and the path and embodiments are not limited to the examples provided in this disclosure.

Figure 2:
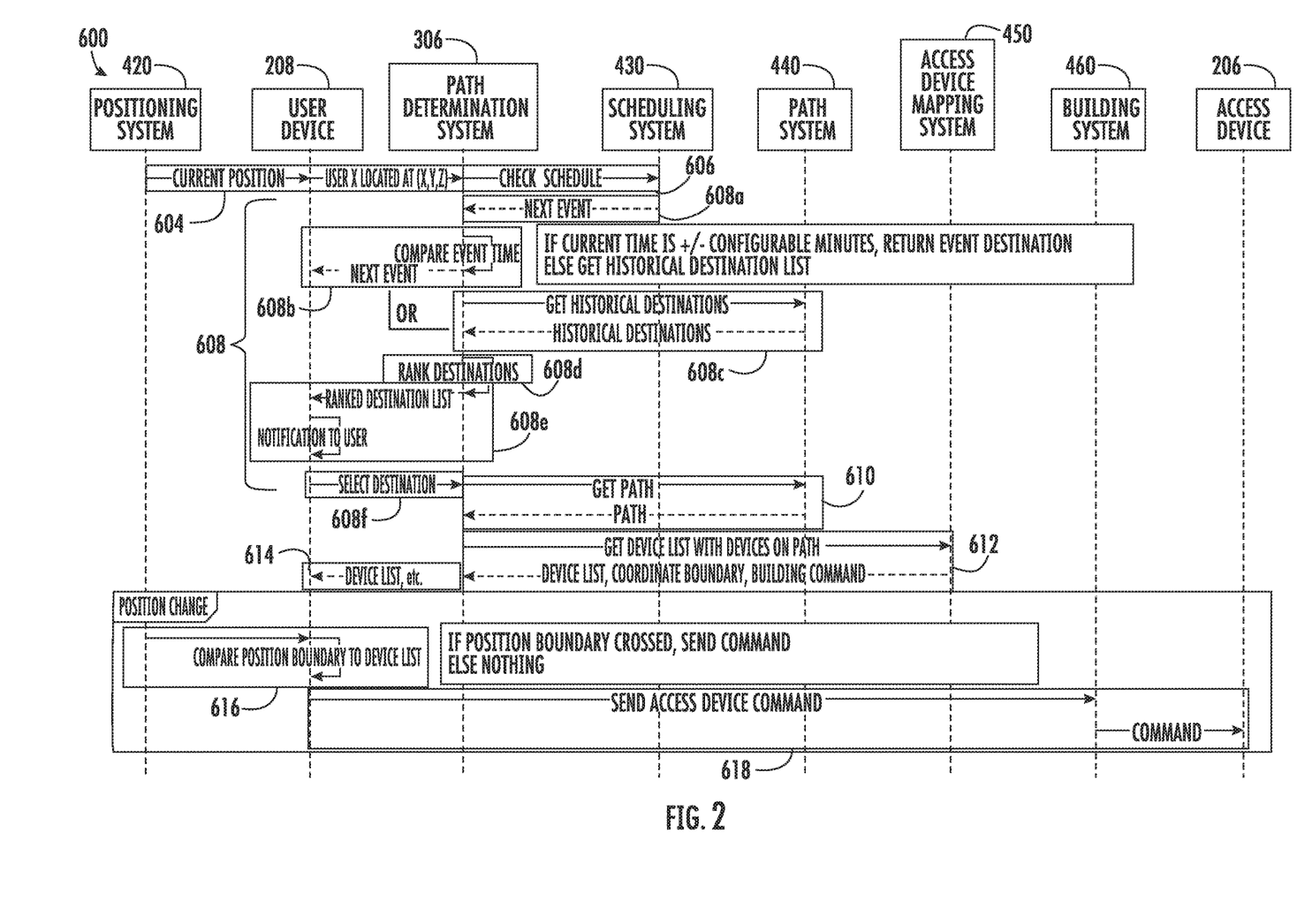
FIG. 2 is a flow diagram illustrating a method of controlling access to at least one access point along a path, according to an embodiment of the present disclosure.

Referring now to FIG. 2, while referencing components of FIG. 1. FIG. 2 shows a flow chart of method 600 of controlling access to at least one access point 203 along a path 540, in accordance with an embodiment of the disclosure. At block 604, a current position 510 of a user of the user device 208 is received. As mentioned above, the current position 510 may be transmitted from a position system 420 to at least one of the user device 208 and the path determination system 306. At block 606, the schedule of the user of the user device 208 is checked to obtain a next event 520. As mentioned above, the schedule is stored within a scheduling system 430. In an embodiment, the scheduling system 430 may be included in at least one of the path determination system 306 and the user device 208.

At block 608, the next event in the schedule is determined in response to current time. The next event 250 may be the next chronological event in the schedule. At block 608a the next chronological event in the schedule is transmitted from the scheduling system 430 to the path determination system 306. At block 608b, the path determination system 306 compares a time of the next chronological event with the current time. At block 608b, if the next chronological event is occurring now or within a selected time period (ex: 5 minutes) then the path determination system 306 transmits the next chronological event as the next event 520 to the user device 208 and the method moves onto block 610. In an embodiment, the next event 520 includes the location of the event. At block 608b, if the next chronological event is not occurring now or within the selected time period (ex: 5 minutes) then the path determination system 306 obtains one or more historical destinations 530 in response to current time at block 608c. At block 608d, a likelihood of each historical destination 530 is determined. The path determination system 306 may automatically pick the historical destination 530 with the highest likelihood as the next event 520. Alternatively, at block 608e, each historical destination 530 may be transmitted to the user device 208 and displayed on the user device 208. The user of the user device 208 may select a historical destination 530 as the next event 520 on the user device 208 through a selection input at block 608f.

Once the next event 520 is determined, the path system 440 is configured to determine a path 540 to the next event 520 at block 610. At block 612, the access device mapping system 450 determines an access device list 550 in response to the path 540. In an embodiment, the access device mapping system 450 determines each access device 206 located on the path 540 and includes each of these access devices 206 on the access device list 550. In an embodiment, the access device list 550 includes at least one of a position boundary 560 for each access device 206 on the access device list 550 and an access device command 570 for each access device 206 on the access device list 550. At block 614, the access device list 550 is transmitted to the user device 208.

At block 616, the user device 208 continually monitors the current position 510 to determine whether the user of the user device 208 is within the position boundary 560 of an access device 206. In an alternative embodiment, the path determination system 306 may continually monitor the current position 510 of the user of the user device 208 to determine whether the user of the user device 208 is within the position boundary 560 of an access device 206. At block 618, the user device 208 transmits an access device command 570 to an access device 206 when the user of the user device 208 is located within the position boundary 560 of an access device 206. In an alternative, embodiment, the path determination system 306 transmits an access device command 570 to an access device 206 when the user of the user device 208 is located within the position boundary 560 of an access device 206. The access device command 570 may be sent either directly to the access device 206 or to a building system 460 that relays the access device command 570 to the access device. As mentioned above, the access device command 570 may be to unlock a door 205 or open an elevator 204 in two non-limiting examples.

While the above description has described the flow process of FIG. 2 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of controlling access to at least one access point along a path, the method comprising:
   receiving a current position of a user of a user device;
   checking a schedule of the user of the user device;
   determining a next event in the schedule;
   determining an event destination of a next event in the schedule;
   determining a path from the current position to the event destination;
   determining an access device list of one or more access devices located on the path;
   transmitting a command to each access device when the user of the user device is located within a position boundary of the access device; and
   adjusting the access device when the command is received,
   wherein the determining an event destination of a next event in the schedule further comprises:
     obtaining one or more historical destinations in response to a current time;
     determining a likelihood of each historical destination; and
       selecting the historical destination with the highest likelihood to be the event destination; or
       displaying each historical destination on the user device; and
       receiving a selection input from the user device, the selection input identifying one of the historical destinations as the event destination.

2. The method of claim 1, wherein:
   the historical destinations are displayed on the user device in order of descending likelihood.

3. The method of claim 1, wherein:
   the access device list further includes the position boundary for each access device.

4. The method of claim 1, wherein:
   the access device list further includes the command for each access device.

5. The method of claim 1, wherein the adjusting further comprises:
   unlocking a door lock.

6. The method of claim 1, wherein the adjusting further comprises:
   opening an elevator door.

7. The method of claim 1, wherein prior to the transmitting the method further comprises:
   comparing the current position to each position boundary.

8. The method of claim 1, wherein the determining an event destination of a next event in the schedule further comprises:
   receiving a selection input from the user device, the selection input identifying an event destination as a next event.

9. An access control system comprising:
   a processor;
   a memory comprising computer-executable instructions that, when executed by the processor, cause the processor to perform operations, the operations comprising:
   receiving a current position of a user of a user device;
   checking a schedule of the user of the user device;
   determining a next event in the schedule;

determining an event destination of a next event in the schedule;
determining a path from the current position to the event destination; and
determining an access device list of one or more access devices located on the path,
wherein the determining an event destination of a next event in the schedule further comprises:
  obtaining one or more historical destinations in response to a current time;
  determining a likelihood of each historical destination; and
    selecting the historical destination with the highest likelihood to be the event destination; or
    displaying each historical destination on the user device, and
    receiving a selection input from the user device, the selection input identifying one of the historical destinations as the event destination.

10. The access control system of claim 9, wherein the operations further comprise:
transmitting the access device list to the user device;
wherein the access device list enables the user device to transmit a command to each access device when the user of the user device is located within a position boundary of the access device;
wherein the command adjusts the access device when the command is received.

11. The access control system of claim 10, wherein:
the command adjusts the access device by unlocking a door lock.

12. The access control system of claim 10, wherein:
the command adjusts the access device by opening an elevator door.

13. The access control system of claim 9, wherein the operations further comprise:
transmitting a command to each access device when the user of the user device is located within a position boundary of the access device, wherein the command adjusts the access device when the command is received.

14. The access control system of claim 9, wherein:
the historical destinations are displayed on the user device in order of descending likelihood.

15. The access control system of claim 9, wherein:
the access device list further includes the position boundary for each access device.

16. The access control system of claim 9, wherein:
the access device list further includes the command for each access device.

\* \* \* \* \*